US012798776B2

(12) United States Patent
Madrid

(10) Patent No.: US 12,798,776 B2
(45) Date of Patent: Nov. 17, 2026

(54) INTEGRATED SPREADER ASSEMBLY

(71) Applicant: Safran Seats USA LLC, Gainesville, TX (US)

(72) Inventor: Nahum Madrid, Denton, TX (US)

(73) Assignee: Safran Seats USA LLC, Gainesville, TX (US)

( * ) Notice: Subject to any disclaimer, the term of this patent is extended or adjusted under 35 U.S.C. 154(b) by 38 days.

(21) Appl. No.: 17/974,146

(22) Filed: Oct. 26, 2022

(65) Prior Publication Data

US 2024/0140607 A1 May 2, 2024

(51) Int. Cl.
*B64D 11/06* (2006.01)

(52) U.S. Cl.
CPC ...... *B64D 11/0649* (2014.12); *B64D 11/0619* (2014.12); *B64D 11/0644* (2014.12); *B64D 11/0648* (2014.12)

(58) Field of Classification Search
CPC ............ B64D 11/0619; B64D 11/0649; B64D 11/0644; B64D 11/0648
See application file for complete search history.

(56) References Cited

U.S. PATENT DOCUMENTS 5,133,587 A * 7/1992 Hadden, Jr. ........ B60N 2/42709 297/146
5,553,923 A * 9/1996 Bilezikjian ........ B64D 11/0696 297/452.2
6,644,738 B2 * 11/2003 Williamson ....... B64D 11/0638 297/216.2
10,124,899 B2 * 11/2018 Mansouri ............... B64D 11/06
10,501,189 B2 * 12/2019 Malligere .............. F16M 13/02
2001/0033101 A1 10/2001 Plant
2003/0080597 A1 5/2003 Beroth et al.
2015/0284087 A1 10/2015 Henshaw
2021/0206495 A1 * 7/2021 Murnan ............. B64D 11/0649
2022/0250750 A1 8/2022 Mansouri et al.
2022/0411069 A1 * 12/2022 Parker .................. B60N 2/0284

FOREIGN PATENT DOCUMENTS

EP 3715253 A1 9/2020
WO 2015153840 A1 10/2015
WO 2021021162 A1 2/2021
WO WO2021/021162 * 2/2021
WO 2021066792 A1 4/2021

OTHER PUBLICATIONS

International Application No. PCT/US2023/035340, International Search Report and Written Opinion mailed on Feb. 9, 2024, 13 pages.
European Patent Application No. 23808940.3, Office Action mailed Jan. 14, 2026, 4 pages.

* cited by examiner

*Primary Examiner* — Philip F Gabler
(74) *Attorney, Agent, or Firm* — Kilpatrick Townsend & Stockton LLP

(57) ABSTRACT

A spreader for a passenger seat includes a body having a forward end and an aft end. The body defines at least one roller support rail monolithic with the body and between the forward end and the aft end. The spreader includes a non-uniform thickness along a length of the body between the forward end and the aft end.

6 Claims, 3 Drawing Sheets

INTEGRATED SPREADER ASSEMBLY

FIELD OF THE INVENTION

The field of the invention relates to passenger seats for passenger vehicles such as aircraft, and more particularly to passenger seats with spreader assemblies.

BACKGROUND

Passenger vehicles, such as aircraft, buses, trains, ships, and automobiles, often include one or more passenger seat assemblies in which passengers may be seated and otherwise use during travel. A passenger seat assembly may include a spreader that may at least partially support seat pans of the passenger seat assembly and/or may help separate the living space of each passenger within the overall seat assembly. In order to save weight, traditional approaches to spreader assemblies have focused on reducing the overall envelope size (i.e., thickness) of the spreader assembly with the assumption that a thinner spreader will provide a lighter spreader. However, spreader assemblies with smaller envelope sizes have lower stiffness, which translates into a low perceived quality of the product.

In addition to weight and stiffness considerations, some passenger seat assemblies include articulating seat pans. Such passenger seat assemblies traditionally require additional supports for guiding motion of the seat pans. However, traditional supports are introduced as separate features and parts that increase the weight of the spreader assembly.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a spreader for a passenger seat includes a body with a forward end, an aft end, and at least one roller support rail monolithic with the body between the forward end and the aft end. In certain embodiments, the body may include a non-uniform thickness along a length of the body between the forward end and the aft end.

In some embodiments, the body includes at least two different thicknesses between the forward end and the aft end.

In various embodiments, a portion of the body forward of the at least one roller support rail has a first thickness, and a portion of the body aft of the at least one roller support rail has a second thickness that is different from the first thickness. Optionally, the second thickness is greater than the first thickness.

In certain embodiments, the body additionally defines a forward aperture for receiving a forward base frame tube for the passenger seat and an after aperture for receiving an aft base frame tube for the passenger seat.

The body includes an upper portion and a lower portion. The upper portion may support an armrest for the passenger seat and the at least one roller support rail is defined on the lower portion of the body. In certain embodiments, the lower portion includes a top side and a bottom side, and the at least one roller support rail are defined at the top side.

The body may define at least one aperture for receiving a base frame tube and at least one weight-reduction aperture in certain embodiments.

In some embodiments, the body includes a side surface, and the at least one roller support rail includes a rail surface that is recessed into the body relative to the side surface.

In various embodiments, the at least one roller support rail includes a first rail defined on a first side of the body and a second rail defined on a second side of the body.

In certain embodiments, the at least one roller support rail is a structural reinforcement of a main load path on the spreader when the spreader is provided with the passenger seat.

The at least one roller support rail includes a receiving area, and an opening to the receiving area may be defined in a top side of the body. In some cases, the receiving area is elongated in a forward and aft direction, and an end of the receiving area is between the opening and the aft end of the body.

Optionally, the at least one roller support rail defines a maximum thickness of the body.

According to certain embodiments, a passenger seat includes the spreader and an armrest pivotably attached to the spreader.

According to certain embodiments of the present invention, a spreader for a passenger seat includes a body with a forward end and an aft end, and the body defines at least one roller support rail monolithic with the body between the forward end and the aft end. The at least one roller support may include a receiving area elongated in a forward and aft direction and with an opening defined in a top side of the body, and an end of the receiving area may be between the opening and the aft end of the body.

In some embodiments, the spreader includes a non-uniform thickness.

In various embodiments, the body defines a forward aperture for receiving a forward base frame tube, an aft aperture for receiving an aft base frame tube, and a plurality of weight-reduction apertures between the forward aperture and the aft aperture.

According to certain embodiments of the present invention, a spreader for a passenger seat includes a body with a forward end and an aft end, and the body defines a forward aperture for receiving a forward base frame tube for the passenger seat and an aft aperture for receiving an aft base frame tube for the passenger seat. The body may include a non-uniform thickness between the forward end and the aft end.

In certain embodiments, the body further defines roller support rails monolithic with the body.

Various implementations described herein may include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The specification makes reference to the following appended figures, in which use of like reference numerals in different figures is intended to illustrate like or analogous components.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide spreader assemblies for passenger seats. While the spreader assemblies are discussed for use with aircraft seats, they are by no means so limited. Rather, embodiments of the spreader assemblies may be used in passenger seats or other seats of any type or otherwise as desired.

Figure 1:
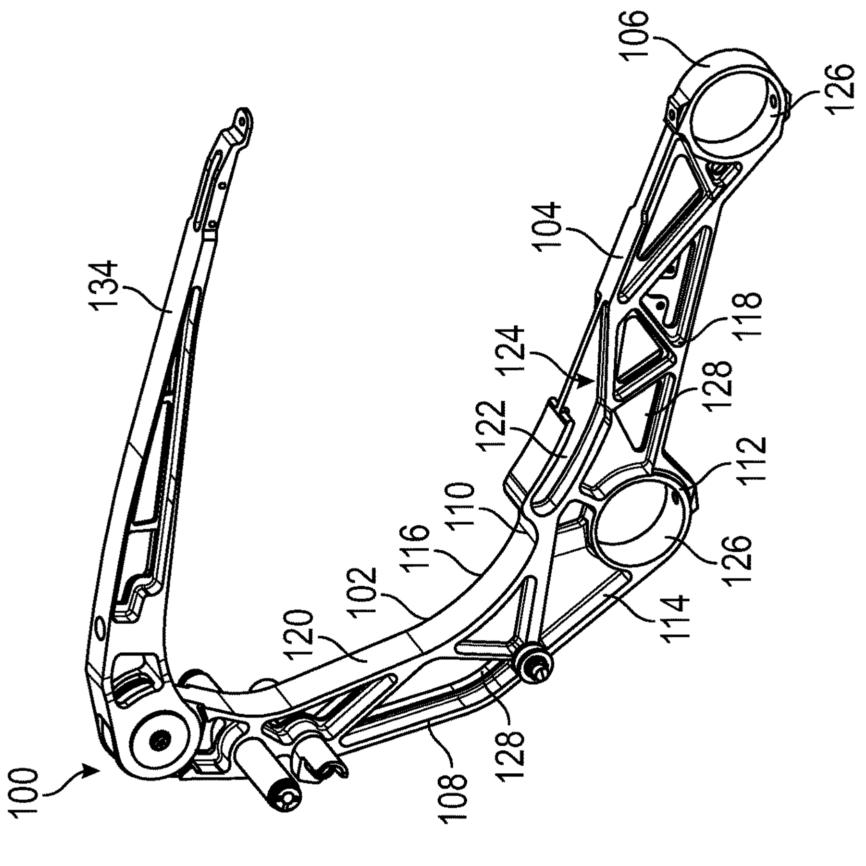
FIG. 1 is a perspective view a spreader assembly for a passenger seat according to embodiments of the present invention.

According to certain embodiments of the present invention, as shown in FIG. 1, a spreader assembly 100 for a passenger seat includes a spreader 102 and optionally an armrest 134. The spreader assembly 100 may include other suitable components as desired. The components of the spreader assembly 100 may be constructed from various suitable materials as desired, including but not limited to, stainless steel, aramid fibers, polycarbonate, polypropylene, aluminum, aluminum alloys, magnesium, magnesium alloys, other metallic materials or non-metallic materials, composite materials, combinations thereof, or other suitable materials.

The spreader 102 includes a body 104 that generally includes a forward end 106, and aft end 108 opposite from the forward end 106, a top side 110, and a bottom side 112 opposite from the top side 110. The body 104 also generally includes a first side 114 and a second side 116 opposite from the first side 114.

Figure 2:
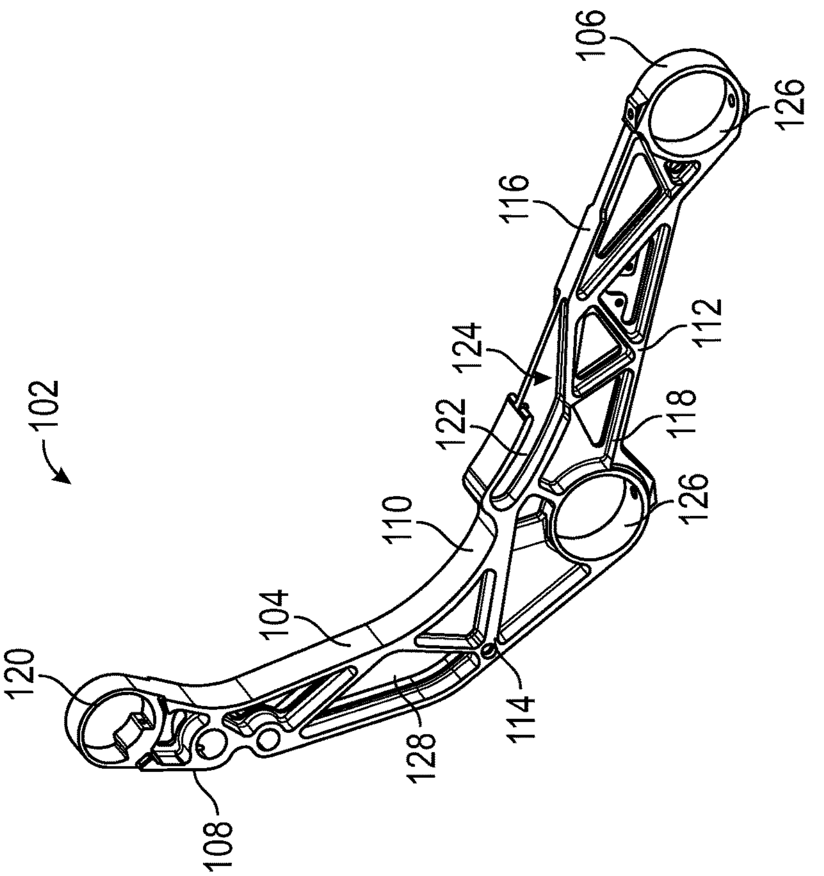
FIG. 2 is a perspective view of a spreader of the spreader assembly of FIG. 1.

In certain embodiments, the body 104 includes a lower portion 118 and an upper portion 120 that generally extends upwards relative to the lower portion 118. The lower portion 118 of the body 104 may define one or more apertures 126 for receiving base frame tubes of the passenger seat. In the embodiment illustrated, the lower portion 118 includes two apertures 126—an aperture 126 proximate to the forward end 106 for receiving a forward base frame tube and an aperture 126 proximate to the aft end 108 for receiving an aft base frame tube. The upper portion 120 may define an upper-most extent of the spreader 102. In certain embodiments, and as illustrated in FIG. 1, the armrest 134 may be coupled or otherwise attached to the upper portion 120 of the spreader 102. In certain embodiments, the armrest 134 is pivotably supported on the spreader 102 such that the armrest 134 is movable between a stowed position (in which the armrest 134 may extend upwards) and a deployed position as illustrated in FIG. 2. The particular armrest 134 illustrated with the spreader 102 should not be considered limiting, and in other embodiments, armrests with other shapes, profiles, etc. may be coupled to the spreader 102 as desired.

In various embodiments, the body 104 of the spreader 102 defines one or more roller support rails 122. In other words, the one or more roller support rails 122 are integral and monolithic with the body 104, and as illustrated in FIG. 2, the spreader 102 is a single component. The roller support rails 122 may support and/or guide rollers or other movement devices of an articulated seat pan of a passenger seat. In certain embodiments, the roller support rails 122 are a structural reinforcement of a main load path on the spreader 102 when the spreader 102 is provided with the passenger seat.

In the embodiment illustrated in FIGS. 1-4, the body 104 defines two roller support rails 122, although any number of roller support rails may be defined as desired. In certain embodiments, the roller support rails 122 may be defined on the lower portion 118 of the body 104 and on one or both sides 114, 116 of the body 104. In the embodiment illustrated, a roller support rail 122 is defined on the first side 114 and the second side 116. In certain embodiments, the roller support rails 122 are defined at or proximate to the top side 110 of the lower portion 118 of the body 104.

Figure 4:
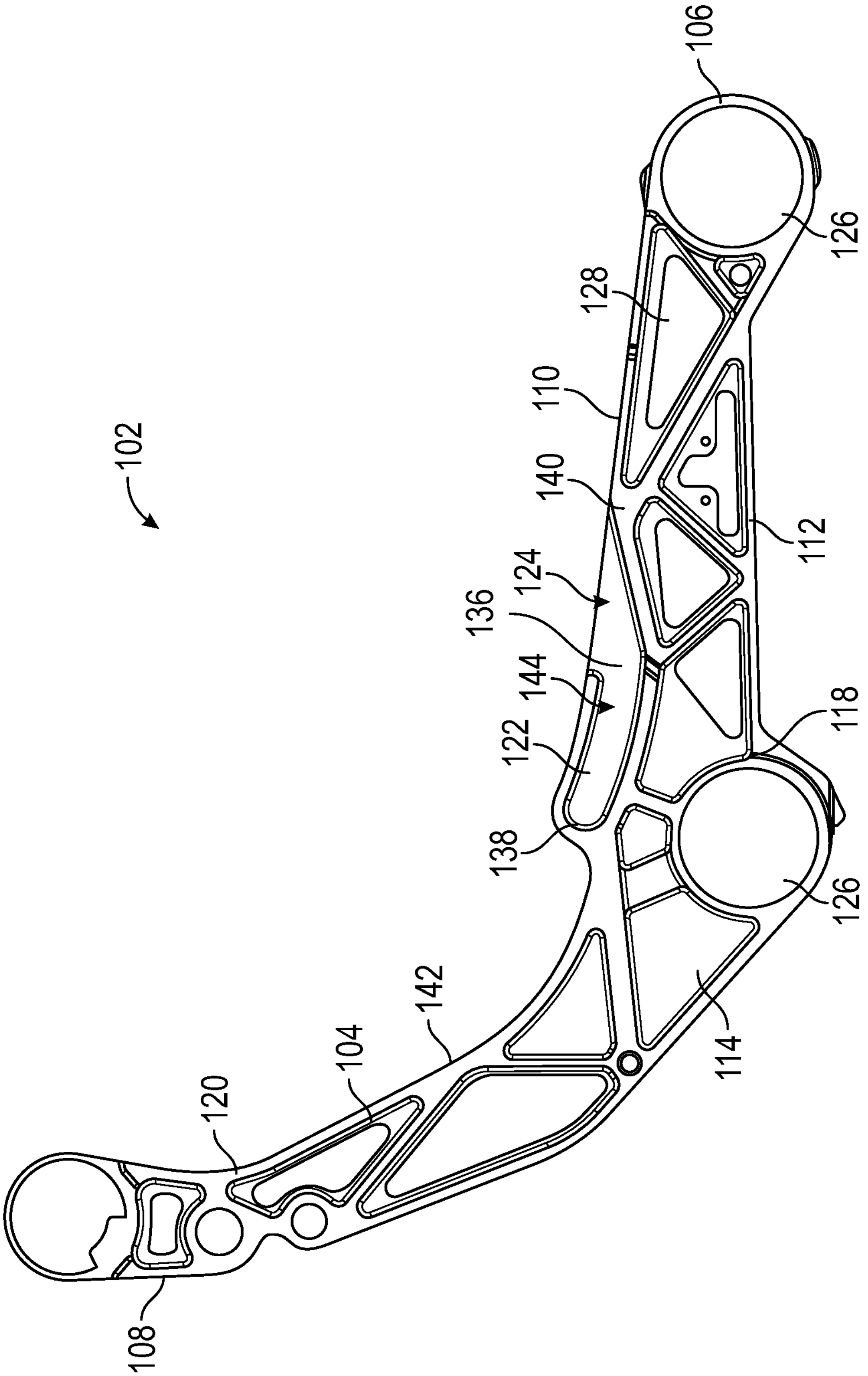
FIG. 4 is a side view of the spreader of FIG. 2.

As best illustrated in FIG. 4, each roller support rail 122 includes a receiving area 144 for receiving the roller(s) of the articulating seat pan, and the receiving area 144 has a rail surface 136 that is recessed relative to the side 114, 116 that the particular roller support rail 122 is defined in. As an example and referring to FIG. 4, in FIG. 4, the rail surface 136 of the roller support rail 122 is recessed into the body 104 relative to the first side 114. The particular roller support rails 122 illustrated should not be considered limiting on the disclosure, and other types of roller support rails 122 with various shapes, profiles, etc. suitable for supporting roller(s) of the articulating seat pan may be defined by the body 104 as desired.

Figure 3:
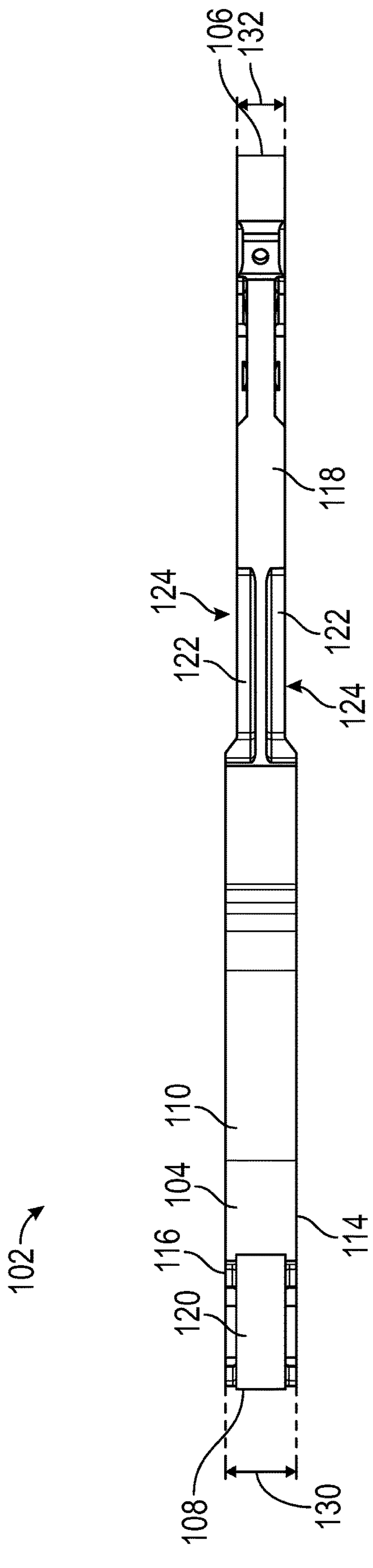
FIG. 3 is a top view of the spreader of FIG. 2.

In the example illustrated in FIGS. 1-4, in certain embodiments, the roller support rails 122 optionally are elongated in a forward and aft direction. Optionally, the body 104 defines an opening 124 to the receiving area 144 such that the roller(s) may be positioned within the receiving area 144. When included, in certain embodiments and as illustrated in FIGS. 3 and 4, the openings 124 to the receiving areas 144 may be defined in the top side 110 of the body 104 and/or in other portions of the body 104 as desired. The particular location of the openings 124 illustrated should not be considered limiting. In various embodiments, an end 138 of the receiving area 144 is between the opening 124 and the aft end 108 of the body 104. In other embodiments, the body 104 need not define an opening 124 to the receiving area 144. In such embodiments, the recessed rail surface 136 may be encircled or encompassed by a perimeter wall.

As best illustrated in FIG. 3, in various embodiments, the body 104 includes a non-uniform thickness along a length of the body 104 from the forward end 106 to the aft end 108, and the body 104 may include at least two different thickness along the length of the body 104. In certain embodiments, the body 104 includes at least a first portion 140 having a first thickness 130 and a second portion 142 having a second thickness 132 different from the first thickness 130. Optionally, the first portion 140 includes the forward end 106 and the second portion 142 includes the aft end 108. In the embodiment illustrated, the first thickness 130 is less than the second thickness 132. In some embodiments, the first thickness 130 is less than a thickness of a traditional spreader (and which traditionally has a uniform thickness), and the second thickness 132 may be greater than the thickness of the traditional spreader. Optionally, the second portion 142 includes the one or more roller support rails 122, and the first portion 140 is the portion of the body 104 forward of the one or more roller support rails 122. In certain embodiments, the one or more roller support rails 122 define a maximum thickness of the spreader 102.

Counter-intuitive to traditional approaches, the non-uniform thickness of the spreader 102 and increasing the maximum thickness or envelope size of the spreader 102 results in a lighter overall assembly while also improving the stiffness of the spreader 102. As an example, the increased thickness of the second portion 142 allows the body 104 to define the one or more roller support rails 122. The increased thickness of the second portion 142 also allows the spreader 10 have a larger geometric moment of inertia (and thereby improved stiffness) compared to traditional spreaders. The monolithic spreader 102 defining the roller support rails 122 with the increased thickness in turn provides weight savings by eliminating excess components (e.g., attachment hardware) previously required for the separate roller supports. The increased and non-uniform thickness further facilitates additional weight reduction by allowing for overall reduced material usage. As a non-limiting example, the increased thickness of the second portion 142 allows the first portion 140 to have a reduced thickness 130 compared to traditional spreaders. Additionally or alternatively, the body 102 may define one or more weight-reduction apertures 128 for improved weight savings, the number, shape, size, and location of which should not be considered limiting. In the embodiment illustrated, the body 102 defines a plurality of weight reduction apertures 128—a first plurality of weight reduction apertures 128 are defined in the lower portion 118 (e.g., between the apertures 126) and a second plurality of weight reduction apertures 128 are defined in the upper portion 120. Various other benefits and advantages may be realized with the apparatuses, systems, and methods provided herein, and the aforementioned advantages should not be considered limiting.

A collection of exemplary embodiments are provided below, including at least some explicitly enumerated as "Examples" providing additional description of a variety of example embodiments in accordance with the concepts described herein. These examples are not meant to be mutually exclusive, exhaustive, or restrictive; and the disclosure not limited to these examples but rather encompasses all possible modifications and variations within the scope of the issued claims and their equivalents.

Example A. A spreader for a passenger seat, the spreader comprising a body comprising a forward end and an aft end, wherein the body defines at least one roller support rail monolithic with the body between the forward end and the aft end, and wherein the body comprises a non-uniform thickness along a length of the body between the forward end and the aft end.

Example B. The spreader of any of any preceding or subsequent examples or combination of examples, wherein the body comprises at least two different thicknesses between the forward end and the aft end.

Example C. The spreader of any of any preceding or subsequent examples or combination of examples, wherein a portion of the body forward of the at least one roller support rail comprises a first thickness, and wherein a portion of the body aft of the at least one roller support rail comprises a second thickness that is different from the first thickness.

Example D. The spreader of any of any preceding or subsequent examples or combination of examples, wherein the second thickness is greater than the first thickness.

Example E. The spreader of any of any preceding or subsequent examples or combination of examples, wherein the body further defines a forward aperture for receiving a forward base frame tube for the passenger seat and an after aperture for receiving an aft base frame tube for the passenger seat.

Example F. The spreader of any of any preceding or subsequent examples or combination of examples, wherein the body comprises an upper portion and a lower portion, wherein the upper portion is configured to support an armrest for the passenger seat, and wherein the at least one roller support rail is defined on the lower portion of the body.

Example G. The spreader of any of any preceding or subsequent examples or combination of examples, wherein the lower portion comprises a top side and a bottom side, and wherein the at least one roller support rail are defined at the top side.

Example H. The spreader of any of any preceding or subsequent examples or combination of examples, wherein the body further defines at least one aperture for receiving a base frame tube and at least one weight-reduction aperture.

Example I. The spreader of any of any preceding or subsequent examples or combination of examples, wherein the body comprises a side surface, and wherein the at least one roller support rail comprises a rail surface recessed into the body relative to the side surface.

Example J. The spreader of any of any preceding or subsequent examples or combination of examples, wherein the at least one roller support rail comprises a first rail defined on a first side of the body and a second rail defined on a second side of the body.

Example K. The spreader of any of any preceding or subsequent examples or combination of examples, wherein the at least one roller support rail is a structural reinforcement of a main load path on the spreader when the spreader is provided with the passenger seat.

Example L. The spreader of any of any preceding or subsequent examples or combination of examples, wherein the at least one roller support rail comprises a receiving area, and wherein an opening to the receiving area is defined in a top side of the body.

Example M. The spreader of any of any preceding or subsequent examples or combination of examples, wherein the receiving area is elongated in a forward and aft direction, and wherein an end of the receiving area is between the opening and the aft end of the body.

Example N. The spreader of any of any preceding or subsequent examples or combination of examples, wherein the at least one roller support rail defines a maximum thickness of the body.

Example O. A passenger seat comprising the spreader of any of any preceding or subsequent examples or combination of examples and an armrest pivotably attached to the spreader.

Example P. A spreader for a passenger seat, the spreader comprising a body comprising a forward end and an aft end, wherein the body defines at least one roller support rail monolithic with the body between the forward end and the aft end, wherein the at least one roller support comprises a receiving area elongated in a forward and aft direction and with an opening defined in a top side of the body, and wherein an end of the receiving area is between the opening and the aft end of the body.

Example Q. The spreader of any of any preceding or subsequent examples or combination of examples, wherein the spreader comprises a non-uniform thickness.

Example R. The spreader of any of any preceding or subsequent examples or combination of examples, wherein the body further defines a forward aperture for receiving a forward base frame tube, an aft aperture for receiving an aft base frame tube, and a plurality of weight-reduction apertures between the forward aperture and the aft aperture.

Example S. A spreader for a passenger seat, the spreader comprising a body comprising a forward end and an aft end, wherein the body defines a forward aperture for receiving a forward base frame tube for the passenger seat and an aft aperture for receiving an aft base frame tube for the passenger seat, and wherein the body comprises a non-uniform thickness between the forward end and the aft end.

Example T. The spreader of any of any preceding or subsequent examples or combination of examples, wherein the body further defines roller support rails monolithic with the body.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A spreader for a passenger seat, the spreader comprising a body comprising a forward end and an aft end, wherein:

the body defines a first roller support rail defined on a first side of the body and a second roller support rail defined on a second side of the body, the second side of the body opposing the first side of the body, and the first roller support rail and the second roller support rail being monolithic with the body between the forward end and the aft end;

the body comprises a non-uniform thickness along a length of the body between the forward end and the aft end;

the body further defines a forward aperture for receiving a forward base frame tube for the passenger seat and an aft aperture for receiving an aft base frame tube for the passenger seat;

the first roller support rail and the second roller support rail each comprise a rail surface recessed into the body relative to a respective side surface of the body;

the first roller support rail and the second roller support rail each comprise a receiving area with an opening defined in a top surface of the body; and wherein a portion of the body forward of the first roller support rail and the second roller support rail comprises a first thickness, and wherein a portion of the body aft of the first roller support rail and the second roller support rail comprises a second thickness that is different from the first thickness, wherein the second thickness is greater than the first thickness, and wherein at least one of the first roller support rail and the second roller support rail defines a maximum thickness of the body, and wherein the receiving area is elongated in a forward and aft direction, and wherein an end of the receiving area is between the opening and the aft end of the body.

2. The spreader of claim 1, wherein the body comprises an upper portion and a lower portion, wherein the upper portion is configured to support an armrest for the passenger seat, and wherein the first roller support rail and the second roller support rail are defined on the lower portion of the body.

3. The spreader of claim 2, wherein the lower portion comprises a top side and a bottom side, and wherein the first roller support rail and the second roller support rail are defined at the top side.

4. The spreader of claim 1, wherein:

the body defines a plurality of apertures between the forward aperture and the aft aperture;

the first roller support rail and the second roller support rail are each positioned on opposing sides of the body and extend longitudinally between the forward aperture and the aft aperture;

the body further comprises an upper portion configured to support an armrest and a lower portion in which the first roller support rail and the second roller support rail are defined.

5. The spreader of claim 1, wherein the first roller support rail and the second roller support rail are a structural reinforcement of a main load path on the spreader when the spreader is provided with the passenger seat.

6. A passenger seat comprising the spreader of claim 1 and an armrest pivotably attached to the spreader.

* * * * *